United States Patent [19]

Bhowmik

[11] Patent Number: 4,941,147
[45] Date of Patent: Jul. 10, 1990

[54] RING RESONATORS WITH INTRACAVITY GRAZING INCIDENCE TELESCOPES

[75] Inventor: Anup Bhowmik, Westlake Village, Calif.

[73] Assignee: Rockwell International Corporation, El Segundo, Calif.

[21] Appl. No.: 413,796

[22] Filed: Sep. 28, 1989

[51] Int. Cl.⁵ .............................................. H01S 3/083
[52] U.S. Cl. ......................................... 372/94; 372/37
[58] Field of Search .............................. 372/37, 94, 99

[56] References Cited

U.S. PATENT DOCUMENTS

| | | | |
|---|---|---|---|
| 4,272,158 | 6/1981 | Johnston et al. | 372/94 |
| 4,723,247 | 2/1989 | Bhowmik et al. | 372/2 |
| 4,744,090 | 5/1989 | Freiberg | 372/94 |
| 4,841,541 | 6/1989 | Sziklas et al. | 372/94 |

OTHER PUBLICATIONS

"Design of Ring Resonator for Burst Mode Free Electron Laser" S. V. Gunn and K. C. Sun, AIAA 19th Fluid Dynamics, Plasma Dynamics and Lasers conference—Jun. 8-10, 1987, pp. 1, 2, 3.

Primary Examiner—William L. Sikes
Assistant Examiner—Robert E. Wise
Attorney, Agent, or Firm—H. Fredrick Hamann; Harry B. Field; Steven E. Kahm

[57] ABSTRACT

An unstable ring resonator employing grazing incidence telescopic mirrors to expand a high power laser beam after it emerges from the wiggler. The grazing incidence mirror is used to increase the footprint of the laser beam on the mirrors surface to decrease the laser's intensity on the surface of the mirror, and thus increase the power of the laser which can be handled in a ring resonator. The ring resonator consists of a scraper mirror 12, a turning mirror 13, a grazing incident beam reduction telescope 101 comprising mirror components 1 and 2, a wiggler 4, a grazing incident beam expansion telescope 102 comprising mirror components 6 and 7 and a second turning mirror 14. The grazing incident telescopes can have mirror components which are of the cone/cone, hyperbola/parabola, cylinder/cylinder or hyperboloid/paraboloid type. The telescopes may also have three or more optical elements.

19 Claims, 3 Drawing Sheets

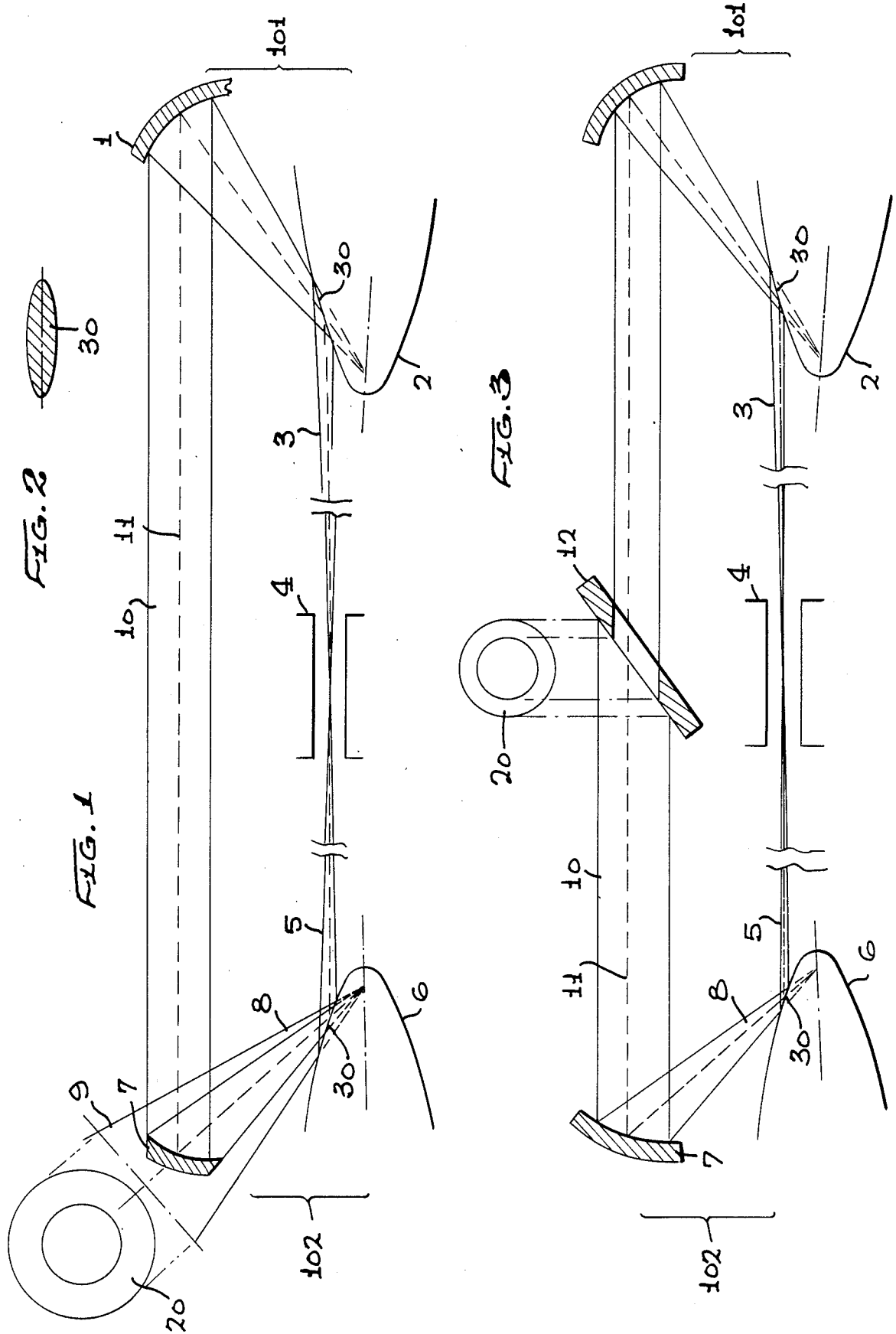

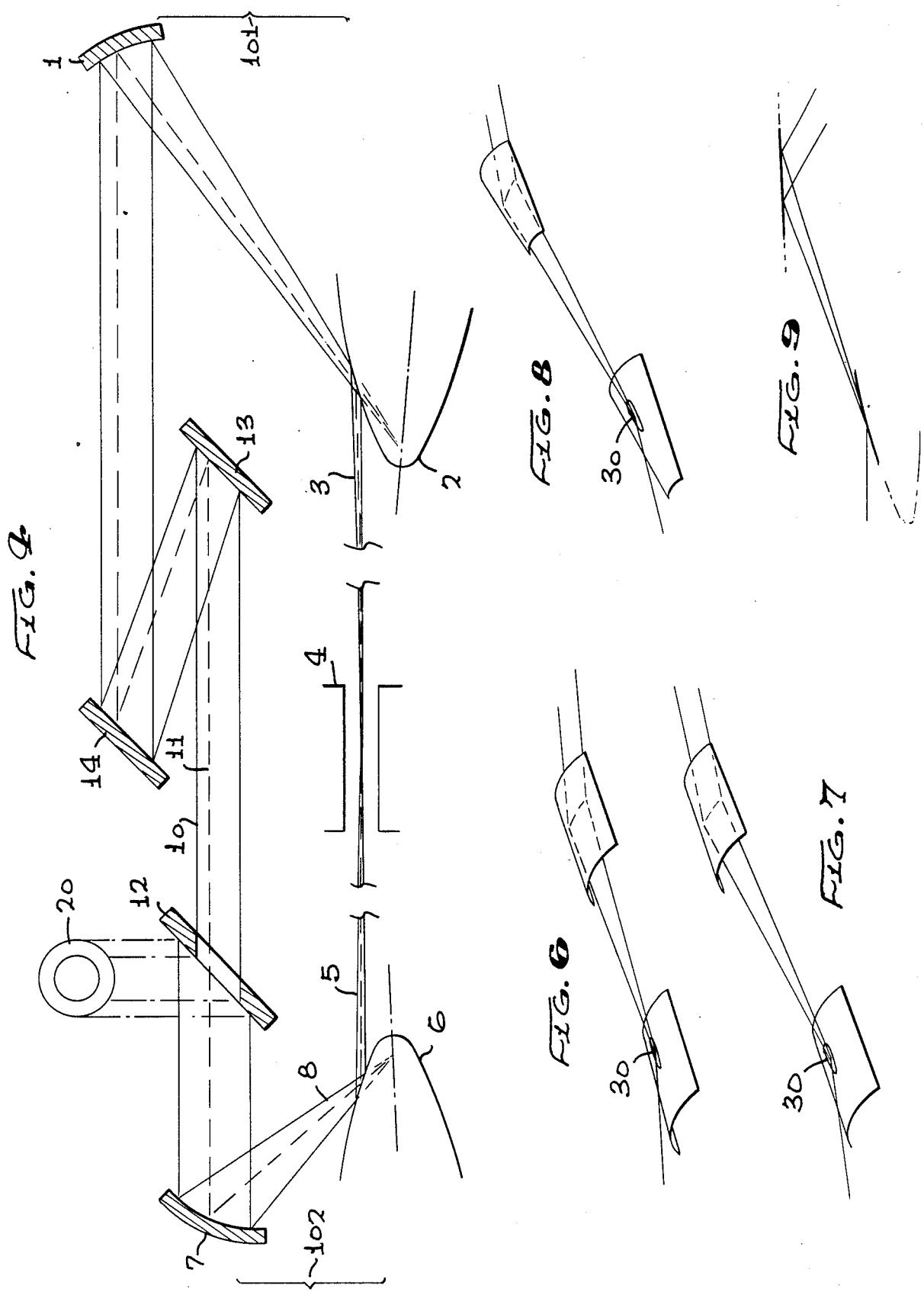

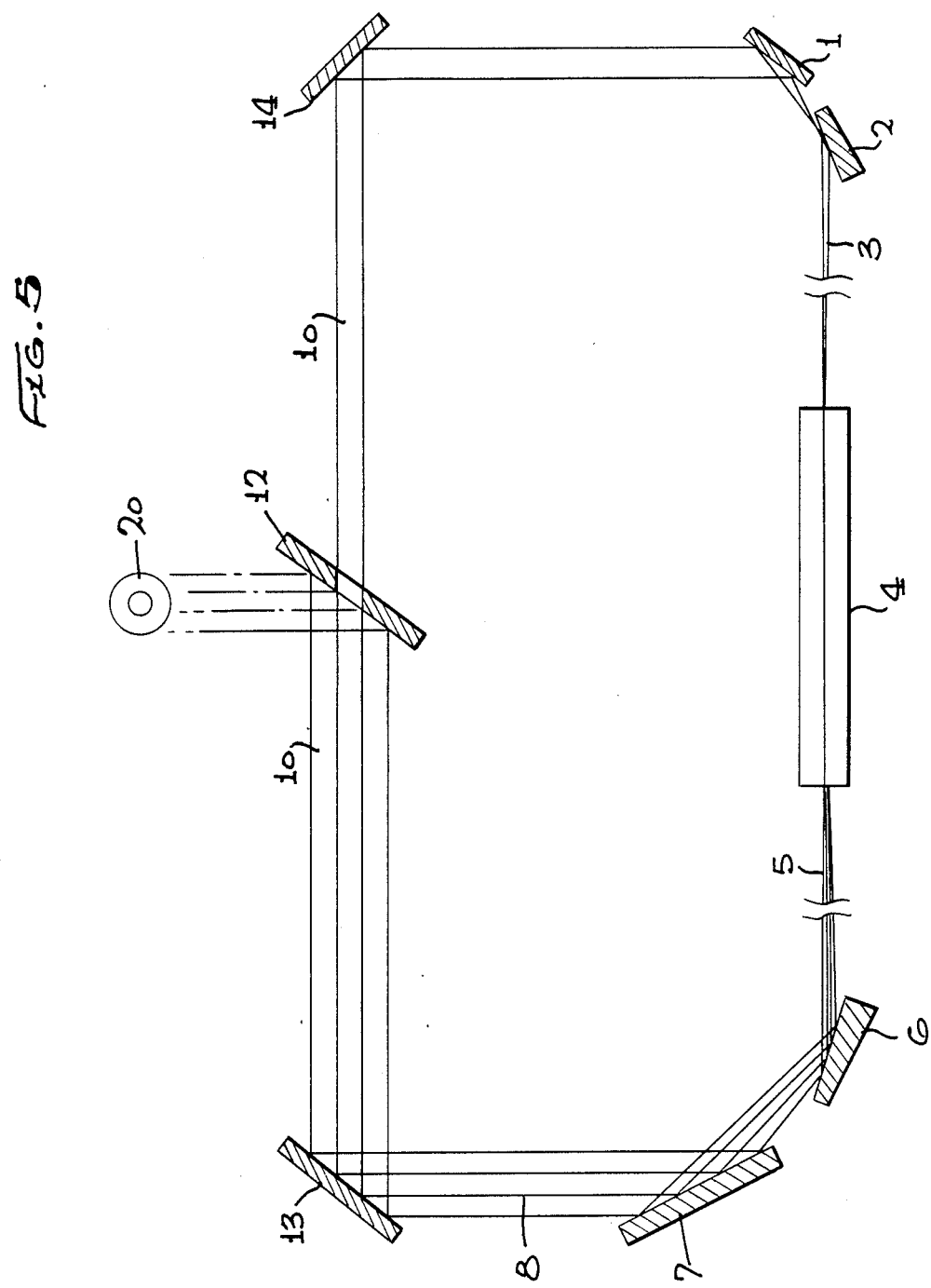

4,941,147

RING RESONATORS WITH INTRACAVITY GRAZING INCIDENCE TELESCOPES

FIELD OF THE INVENTION

This invention relates to ring resonators with grazing incidence beam expansion for a free electron laser.

BACKGROUND OF THE INVENTION

A free electron laser requires a beam of relativistic electrons to be superimposed with an intense laser beam within a static, periodic magnetic field. Energy is exchanged between the electrons and the laser radiation field to produce coherent radiation or amplification of the laser beam.

The radiation energy density of a high power free electron laser can be on the order of tens of megawatts/$cm^2$. Such high flux densities will damage a mirror surface.

If a wiggler with two spherical mirrors is used in a conventional stable resonator and diffractive spreading of the beam is relied on for flux reduction, then mirror spacings of several hundred meters would be required to obtain acceptable irradiance levels for even the most advanced high power optics, such as actively cooled silicon.

If such long resonators are used, then alignment of the beam to keep it coaxial with the electron beam becomes extremely critical, and may be the limiting parameter for the device.

If the optical elements nearest the wiggler are at grazing angle of incidence then the overall length of the resonator can be considerably reduced. At grazing incidence the area of the optical mode can be considerably larger than at normal incidence. A ring configuration (rather than a standing wave configuration) further reduces the resonator length by approximately a factor of two since one way flux is incident on the grazing optical elements instead of two-way flux. Since the free-electron laser gain medium is unidirectional, the reverse mode is absent and no additional means are required for its suppression.

In stable resonators, output is taken through a partially transmitting element which cannot be actively cooled, and therefore can be easily distorted or even destroyed by high flux densities. An unstable resonator permits convenient output coupling around the edges of a scraper element which can be made out of metal, or other high conductivity materials like silicon and can be efficiently cooled with coolant flowing through the material. In a stable resonator an alternative output coupling scheme may be a grating rhomb arrangement. The grating rhomb is a costly element, susceptible to damage and it limits the tuning range of the otherwise continuously tuneable free-electron laser. No such restrictions are imposed by an unstable resonator.

The extraction efficiency of the free electron laser is an important performance parameter. Because of the limitations discussed above, a free electron laser with a stable resonator is likely to be less efficient than the one using an unstable resonator.

SUMMARY OF THE INVENTION

The invention uses an unstable ring resonator with grazing incidence telescopic mirrors to direct a beam around the ring resonator and through the gain region of the wiggler. It also employs a scraper mirror for outcoupling.

The grazing incidence telescopic mirrors reduce the flux on the mirror's surface so the power of the free electron laser may be increased. Alternatively for a given power the laser may be made more compact.

The beam traveling in only one direction eliminates the problem of reverse mode interference.

The unstable ring resonator design with a scraper mirror is capable of higher power loads than stable configurations allowing higher power lasers to be operated, and their efficiency will be also higher.

Reduction of the resonator length may be realized by use of grazing angle of incidence mirrors, which provide large area mode footprints on all the mirrors in a compact device.

BRIEF DESCRIPTION OF THE DRAWINGS

FIG. 1 is a schematic of the simplest embodiment of the ring resonator system.

FIG. 2 is the footprint of the beam on mirror 1.

FIG. 3 is a schematic of the ring resonator system with a scraper mirror.

FIG. 4 is a schematic of the ring resonator system with turning mirrors.

FIG. 5 is a second embodiment of the ring resonator system with turning mirrors.

FIG. 6 is a cylinder/cylinder grazing incidence telescopic mirror configuration.

FIG. 7 is a hyperbola/parabola configuration.

FIG. 8 is a cone/cone configuration.

FIG. 9 is a hyperboloid/paraboloid configuration.

DETAILED DESCRIPTION OF THE PREFERRED EMBODIMENT

FIG. 1 is a schematic of an unstable ring resonator with intracavity grazing optics in its simplest embodiment. It is comprised of a beam compacting telescope 101, a wiggler 4 and a beam expanding telescope 102.

The beam compacting telescope 101 consisting of confocal mirrors 1 and 2, transforms an incoming collimated beam 10 of a relatively large diameter into a beam 3 of a relatively small diameter. Similarly, the beam expanding telescope 102 consisting of confocal mirrors 6 and 7 performs the inverse transformation.

Following the beam clockwise around the ring we see that beam 10. whose diameter may be 10 or 20 cm, enters the beam compacting telescope 101 and is incident on mirror 1. Upon reflection the beam converges towards the focus of mirror 1. Before reaching the focus of mirror 1, the converging beam is intercepted by the surface of mirror 2 located in a precisely confocal arrangement with respect to mirror 1. At mirror 2, the beam cross-section viewed normal to the axis is approximately 1 cm or less in diameter. However, its footprint 30 (FIG. 2), on the surface of mirror 2 is much elongated in one direction because of its grazing angle of incidence. At 87 degrees the beam footprint is enlarged by a factor of 19 thereby spreading the flux over a large surface area. Mirror 2 redirects the 1 cm diameter beam 10 as beam 3 which continues to converge as it enters the wiggler 4, where it is approximately 1 mm or less in diameter. At the wiggler, energy is added to the beam. The wiggler 4 may be for a high power free-electron laser.

Near the center of the wiggler is the focal point for beam 3. Thereafter it begins to diverge as beam 5. Beam 5 enters the beam expanding telescope 102 and is incident on mirror 6 with a large footprint as on mirror 2. Beam 5 is reflected from mirror 6 as diverging beam 8. The magnification of the beam expansion telescope 102 can be higher than that of the beam compaction telescope 101. Thus beam 8 can be magnified to a diameter larger than that of mirror 7. This allows part of beam 8 to be outcoupled from the resonator as beam 9 by scraping around the edge of mirror 7. A cross-section 20 of the outcoupled beam 9 is shown in FIG. 1. In general the outcoupled beam may have an elliptical or more complicated shape. Part of beam 8 is fed back into the resonator by mirror 7 as a collimated beam 10. Beam 10 is recirculated by mirror 1, thus completing the ring.

The unstable resonator is reduced to a stable resonator when both the beam compaction and beam expansion telescopes have the same magnification. In that case, laser output must be taken by making one of the elements partially transmitting, or with the help of a grating. Both schemes have limited power scaling capability.

FIG. 3 shows a second embodiment of the invention using an independent scraper element 12. Mirror 7 reflects all of diverging beam 8. The scraper mirror 12 is employed to outcouple part of beam 10. A cross section 20 of the outcoupled beam is shown in FIG. 3.

FIGS. 4 and 5 show improved embodiments where turning mirrors 13 and 14 are added to easily adjust the path length and alignment of the beam.

In order for the resonator to function, both telescopes must be precisely aligned to each other and the individual elements within each telescope must also be precisely aligned to one another. This is indicated by the continuity of the broken line around the ring, which is a self-reproducing ray called the resonator optical axis 11. When used in a free-electron laser, the wiggler 4 must also be aligned precisely to the optical axis 11. Also, when used in a free-electron laser driven by a pulsed radio-frequency accelerator, the roundtrip length of the resonator must be precisely controlled so that at the wiggler entrance the arrival of light pulses coincides with the arrival of electron pulses to produce amplification.

Since the ring resonator in FIG. 1 is designed for high power free electron lasers, the flux density of beam 5 emerging from wiggler 4 will be very high. It can be expected to be several tens of megawatts/cm$^2$. Therefore if standard optics or mirrors were used in the ring they would be quickly damaged by the beam thereby destroying the ring resonator.

In order for the mirrors to survive, mirrors 2 and 6 are used at grazing incidence so that the beam footprint is spread over a large surface area. The grazing incidence telescope consisting of mirrors 6 and 7 spreads beam 5 out from approximately 1 mm in diameter to approximately 10 cm in diameter in beam 10. This reduces the flux density of the beam by a factor of several thousand to one, and allows the mirrors to easily handle the energy impact on their surfaces without distortion.

If the laser wavelength is 0.5 micron, then the 1 mm beam whose normal section is 0.03 cm$^2$. will have a footprint on the first mirror 6 in the grazing incidence telescope of approximately 114 cm$^2$ and a footprint on the second mirror 7 in the grazing incidence telescope of approximately 201 cm$^2$. This spreading of the flux density of the laser beam allows the grazing incidence mirrors to reflect large intensity beams without damaging the mirror.

If conventional resonators were employed, the mirrors at the ends of the resonators would have to be very far apart to allow the beam to diffuse enough by diffraction so it would not destroy the mirrors. Since the system is in a vacuum, the long lengths required would make the system very expensive.

A conventional resonator would have to be several hundred meters long. A resonator with grazing incidence telescopic mirrors can be on the order of 50 meters long.

When the resonator is hundreds of meters long, alignment of the beams would be very difficult and would be a limiting factor, since in a free electron laser the beam must be precisely lined up with the electron beam in the magnetic field of the wiggler. The alignment sensitivity for a 250 meter resonator would be on the order of 1/10 to 1/100 microradians. With the glancing incidence telescopic mirrors, the resonator can be reduced to 50 meters with an alignment sensitivity on the order of 1 to 10 microradian.

Therefore the grazing incidence telescopic design is a significant improvement since it allows beam 3 to be very narrow and relatively easily aligned due to its proximity to the wiggler and compactness of the resonator.

There are four designs of grazing incidence telescopic mirrors shown in FIGS. 6, 7, B, and 9 respectively.

In each the angle of incidence of beam 5 on grazing incidence telescopic mirror 6 is approximately 87°. Thus the footprint of the beam 5 is over a large area of mirror 6 reducing the flux density and allowing the mirror to survive the impact of beam 5 with no damage or warping caused by heat.

FIG. 6 shows a cylinder/cylinder grazing incidence telescope. The elements consist of portions of the outer and inner surfaces of cylinders, with the axes of the cylinders contained in the plane of incidence. In FIGS. 1-5 mirrors 1 and 7 would be inner surfaces of cylinders and mirrors 2 and 6 would be outer surfaces of cylinders.

FIG. 7 shows a hyperbola/parabola grazing incidence telescope. The elements consist of portions of the outer surface of a hyperbola and the inner surface of a parabola. In FIGS. 1-5 mirrors 1 and 7 would be the inner surface of a hyperbola and mirrors 2 and 6 would be the outer surface of a parabola.

FIG. 8 shows a cone/cone grazing incidence telescope. The elements consist of right circular cones with the axis of the cone$ contained in the plane of incidence. In FIGS. 1-5 mirrors 1 and 7 would be the inner surface of the cone and mirrors 2 and 6 would be the outer surface of the cone.

FIG. 9 shows a hyperboloid-paraboloid grazing incidence telescope. The elements consist of portions of the outer surface of a hyperboloid and the inner surface of portions of a paraboloid. In FIGS. 1-5 mirrors 1 and 7 would be the inner surface of a paraboloid and the mirrors 2 and 6 would be the outer surface of a hyperboloid.

As an example, if we use a hyperboloid/paraboloid pair for the telescope mirrors each conic has two foci, one for the object point and another for the image point. The hyperboloid has a "negative" focus object point) near the wiggler midpoint and a "positive" focus (virtual image point) within the mirror itself. Thus, a diverging beam originating from the wiggler midpoint will reflect off the hyperboloid and will become a diverging spherical wave that appears to be coming from the positive focus. Note that the photon beam (and electron beam) do not travel along the line connecting the positive and negative foci of a hyperboloid mirror. Therefore, the hyperboloids appear to be slightly tipped with respect to each other.

The paraboloid has an object point that is the same as the hyperboloid's positive focus and a virtual image point at infinity. This geometrical arrangement ensures that the spherical wave from the hyperboloid will be converted into a plane wave.

The baseline telescope geometry is quantitatively defined by the chief ray 11, which is coincident with the electron beam axis in the wiggler region. The chief ray originates from a point source in the middle of the wiggler. As shown in FIGS. 1, 3 and 4, the chief ray reflects off the hyperboloid surface at a point that is approximately 2500 cm from the wiggler midpoint. After reflecting off the hyperboloid at an 87-degree incidence angle, the chief ray propagates 600 cm to the paraboloid. The chief ray is reflected off the paraboloid in a direction that is opposite but nearly parallel to the original input chief ray.

Although the above four types of grazing incidence telescopes have been investigated and found to have tolerable alignment errors and wavefront errors for a free electron laser, other geometries for grazing incidence telescopes may be used.

Further, a cone/cone telescope for reducing the laser beam and a cylinder/cylinder telescope for expanding the laser beam may be used or any other combination of types of telescopes may be used in expanding and reducing the diameter of the laser beams. In other embodiments, 3 or more optical elements may be used in the telescopes.

Since the beam travels around the ring resonator in only one direction, reverse mode suppression problems found in standard resonators are eliminated.

Another advantage of the unstable ring resonator with grazing incidence mirrors is that the mirrors can be cooled to help eliminate distortion caused by the high power laser heating the mirrors. Output elements in a stable resonator do not have this capability and therefore distortion would be a limiting factor in the power output of the system.

The grazing incidence telescopic mirror surfaces are preferably coated with silver for a reflectance of 99.95 percent or better.

The alignment system for the resonator consists of a static control system, a dynamic control system, a path length control system, and an associated installation procedure. The installation procedure involves a series of manually performed steps that result in a precise resonator alignment accomplished at room pressure. The installation procedure uses mechanical and optical tools such as scribes, rulers, reticles, periscopes, and a shear-plate interferometer. The static alignment system features a slow response control loop that maintains the resonator alignment during pumpdown from ambient room pressure to a hard vacuum. The dynamic alignment control system features a fast response control system with one high bandwidth (100 Hz) precision steering mirror.

RF linac FEL oscillators require the exact overlap of each photon packet with a micropulse of electrons. Thus, not only does the optical path length have to be controlled, but it must be an exact integral multiple of the separation distance between the electron micropulses. To effect this path-length control, it is necessary to provide the capability of precise adjustment of the axial position of at least one of the mirror elements in the ring resonator. In the first and second embodiments as shown in FIGS. 1 and 3, the path length control is provided by either mirror 7 or mirror 1. High bandwidth and fine path length adjustment is done by the other mirror 1 or 7. In the embodiments shown in FIGS. 4 and 5, the turning mirrors 13 and 14 are used for path length control.

What is claimed and desired to be secured by letters patent of the United States is:

1. An unstable ring resonator with grazing incidence telescopes consisting of:
   a laser beam having a diameter,
   a grazing incidence beam reduction telescope which reduces the laser beam diameter and redirects the laser beam through a wiggler,
   a grazing incidence beam expansion telescope which enlarges the diameter of the laser beam exiting the wiggler,
   a means of outcoupling a portion of the expanded laser beam from the beam expansion telescope in an unstable ring resonator,
   a means of directing the laser beam exiting the grazing incidence beam expansion telescope so that it enters the grazing incidence beam reduction telescope.

2. An unstable ring resonator with grazing incidence telescopes as in claim 1 where the means of outcoupling a portion of the expanded laser beam from the beam expansion telescope is by having a first optical element and a second optical element where the first optical element expands the laser beam to a diameter larger than the second optical element allowing a portion of the expanded laser beam to be outcoupled by passing the edge of the second optical element.

3. An unstable ring resonator with grazing incidence telescopes as in claim 1 where the means of outcoupling a portion of the expanded laser beam from the expansion telescope is by a scraper mirror.

4. An unstable ring resonator with grazing incidence telescopes as in claim 3 where two turning mirrors are used to adjust the laser beam path length.

5. An unstable ring resonator with grazing incidence telescopes as in claim 4 where, at least one of the grazing telescopes has a first optical element which is a segment of a cone and a second optical element which is a segment of a cone.

6. An unstable ring resonator with grazing incidence telescopes as in claim 4 where, at least one of the grazing incidence telescopes has a first optical element which is a segment of a hyperbola and a second optical element which is a segment of a parabola.

7. An unstable ring resonator with grazing incidence telescopes as in claim 4 where, at least one of the grazing incidence telescopes has a first optical element which is a segment of a cylinder and a second optical element which is a segment of a cylinder.

8. An unstable ring resonator with grazing incidence telescopes as in claim 4 where, at least one of the grazing incidence telescopes has a first optical element which is a segment of a hyperboloid and a second optical element which is a segment of a paraboloid.

9. An unstable ring resonator with grazing incidence telescopes as in claim 4 where at least one grazing incidence telescope has a plurality of optical elements.

10. An unstable ring resonator with grazing incidence telescopes as in claim 3 where at least one of the grazing telescopes has a first optical element which is a segment of a cone and a second optical element which is a segment of a cone.

11. An unstable ring resonator with grazing incidence telescopes as in claim 3 where, at least one of the grazing incidence telescopes has a first optical element which is a segment of a cylinder and a second optical element which is a segment of a cylinder.

12. An unstable ring resonator with grazing incidence telescopes as in claim 3 where, at least one of the grazing incidence telescopes has a first optical element which is a segment of a hyperboloid and a second optical element which is a segment of a paraboloid.

13. An unstable ring resonator with grazing incidence telescopes as in claim 3 where at least one grazing incidence telescope has a plurality of optical elements.

14. An unstable ring resonator with grazing incidence telescopes as in claim 1 where, at least one of the grazing telescopes has a first optical element which is a segment of a cone and a second optical element which is a segment of a cone.

15. An unstable ring resonator with grazing incidence telescopes as in claim 1 where, at least one of the grazing incidence telescopes has a first optical element which is a segment of a hyperbola and a second optical element which is a segment of a parabola.

16. An unstable ring resonator with grazing incidence telescopes as in claim 1 where, at least one of the grazing incidence telescopes has a first optical element which is a segment of a cylinder and a second optical element which is a segment of a cylinder.

17. An unstable ring resonator with grazing incidence telescopes as in claim 1 where, at least one of the grazing incidence telescopes has a first optical element which is a segment of a hyperboloid and a second optical element which is a segment of a paraboloid.

18. An unstable ring resonator with grazing incidence telescopes as in claim 1 where at least one grazing incidence telescope has a plurality of optical elements.

19. An unstable ring resonator with grazing incidence telescopes as in claim 1 where, at least one of the grazing incidence telescopes has a first optical element which is a segment of a hyperbola and a second optical element which is a segment of a parabola.

* * * * *

UNITED STATES PATENT AND TRADEMARK OFFICE
CERTIFICATE OF CORRECTION

PATENT NO. : 4,941,147
DATED : July 10, 1990
INVENTOR(S) : Anup Bhowmik

It is certified that error appears in the above-identified patent and that said Letters Patent is hereby corrected as shown below:

On the Title Page, under "References Cited U.S. PATENT DOCUMENTS", the third reference date should read --5/1988-- rather than "5/1989".

In the Claims:

Claim 1, Column 6, Line 14, after the word "of", please change the "." to --,--.

Claim 10, Column 7, Line 2, after the word "where", insert --,--.

Signed and Sealed this

Second Day of July, 1991

Attest:

HARRY F. MANBECK, JR.

*Attesting Officer*          Commissioner of Patents and Trademarks